US012731198B2

(12) United States Patent
Yu et al.

(10) Patent No.: US 12,731,198 B2
(45) Date of Patent: Sep. 8, 2026

(54) METHOD AND APPARATUS FOR PENALTY PREDICTION AND DISPOSAL DECISION OF ILLEGAL FISHING EVENTS

(71) Applicant: Wuhan University of Technology, Wuhan (CN)

(72) Inventors: Hongchu Yu, Wuhan (CN); Yuhao Xiao, Wuhan (CN); Chen Chen, Wuhan (CN); Weihuang Wu, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 19/363,642

(22) Filed: Oct. 21, 2025

(65) Prior Publication Data

US 2026/0044918 A1 Feb. 12, 2026

Related U.S. Application Data

(63) Continuation-in-part of application No. 18/679,520, filed on May 31, 2024, now abandoned.

(30) Foreign Application Priority Data

Jan. 17, 2024 (CN) ........................ 202410063899.5

(51) Int. Cl.
*G06Q 50/26* (2024.01)

(52) U.S. Cl.
CPC .................................. *G06Q 50/26* (2013.01)

(58) Field of Classification Search
None
See application file for complete search history.

(56) References Cited

U.S. PATENT DOCUMENTS

2014/0229164 A1* 8/2014 Martens ................ G06F 40/279 704/9
2020/0067861 A1* 2/2020 Leddy ................ G06F 21/6245

* cited by examiner

*Primary Examiner* — Laura Yesildag
(74) *Attorney, Agent, or Firm* — Hemisphere Law, PLLC

(57) ABSTRACT

This invention provides a method and apparatus for penalty prediction and disposal decision of illegal fishing events. The method involves acquiring a to-be-decided fishing event and a historical case dataset. The event and historical cases are preprocessed into sentence vectors. The most similar historical case is identified by calculating cosine similarity between vectors. A penalty amount prediction model, trained on the dataset and refined via subtree pruning using a cross-validation-determined threshold, generates a predicted penalty. Based on the case similarity and predicted amount, graded control instructions are automatically issued. These range from warnings to cutting non-essential shipboard equipment and dispatching law enforcement vessels. This enables automated, scientific, and efficient handling of illegal fishing.

6 Claims, 4 Drawing Sheets

METHOD AND APPARATUS FOR PENALTY PREDICTION AND DISPOSAL DECISION OF ILLEGAL FISHING EVENTS

FIELD OF THE DISCLOSURE

The invention relates to the technical field of identification of illegal fishing identification, and specifically to a method and apparatus for penalty prediction and disposal decision of illegal fishing events.

BACKGROUND

Currently, determining whether a fishing activity constitutes illegal fishing and setting the corresponding penalty amount largely relies on manual patrols, which fails to effectively curb illegal fishing activities and often suffers from drawbacks such as dependence on professional experience and susceptibility to errors. Meanwhile, with the upgrading of vessel equipment, the obtained multi-source information and illegal fishing case data are increasingly abundant. How to utilize technologies such as artificial intelligence, text mining, and data fusion to fully leverage this rich information and data to enhance the effectiveness and credibility of accurate penalty determination for illegal fishing, and to form effective and timely disposal methods and equipment, is an urgent problem that needs to be solved in maritime illegal fishing law enforcement.

Therefore, there is an urgent need to provide a method and apparatus for penalty prediction and disposal decision of illegal fishing events to solve the above technical problems.

SUMMARY

In view of this, it is necessary to provide a method and apparatus for penalty prediction and disposal decision of illegal fishing events, thereby addressing the technical problems in the prior art of difficulty in accurately determining the penalty amount for illegal fishing events and the inability to make effective disposal decisions.

On one hand, the present invention provides a method for penalty prediction and disposal decision of illegal fishing events, applied to a system composed of a shipborne terminal, a shipborne controller, and a shore-based server. The method for penalty prediction and disposal decision of illegal fishing events, comprising:

- Acquiring a to-be-decided fishing event based on the shipborne terminal, and obtaining an illegal fishing case dataset stored in the shore-based server, where the illegal fishing case dataset includes a plurality of historical illegal fishing cases;
- Preprocessing the to-be-decided fishing event and the plurality of historical illegal fishing cases respectively based on the shore-based server, correspondingly obtaining a to-be-decided sentence vector and a plurality of historical sentence vectors;
- Determining a plurality of similarity values between the to-be-decided sentence vector and the plurality of historical sentence vectors based on a cosine similarity model built into the shore-based server, and determining a target illegal fishing case corresponding to the to-be-decided fishing event from the plurality of historical illegal fishing cases based on the plurality of similarity values;
- The shore-based server trains a penalty amount prediction model based on the illegal fishing case dataset, and inputs the to-be-decided fishing event into the penalty amount prediction model to obtain a predicted penalty amount for the to-be-decided fishing event;
- The shore-based server is configured to generate a first control instruction when the case similarity and the predicted penalty amount fall within a first grading threshold, generate a second control instruction when the case similarity and the predicted penalty amount fall within a second grading threshold, and generate a third control instruction when the case similarity and the predicted penalty amount fall within a third grading threshold;
- The shipborne controller receives the first control instruction, the second control instruction, and the third control instruction, responds to the first control instruction by controlling a shipborne alarm system to issue a voice reminder, responds to the second control instruction by cutting off shipborne instrument equipment except those related to navigation and positioning, and responds to the third control instruction by cutting off shipborne instrument equipment except those related to navigation and positioning, and through law enforcement agencies, dispatching law enforcement vessels to forcibly interrupt the fishing activity.

In some possible implementations, the data type of the to-be-decided fishing event is text data; then preprocessing the to-be-decided fishing event to obtain the to-be-decided sentence vector, comprising:

- Performing word segmentation processing on the to-be-decided fishing event to obtain a plurality of case words based on a Jieba word segmentation tool built into the shore-based server;
- Processing the plurality of case words to obtain a plurality of case word vectors, based on a vectorization model built into the shore-based server;
- Based on the shore-based server, determining a plurality of word weights for the plurality of case words, and based on the plurality of word weights and the plurality of case word vectors, determining the to-be-decided sentence vector for the to-be-decided fishing event.

In some possible implementations, the to-be-decided sentence vector is:

$$\text{sen\_vec} = \frac{\sum_{i}^{m} vec_i * \lambda_{norm_i}}{m}$$

$$\mu_{norm} = \frac{\mu}{\sqrt{\sum_{i=1}^{m}\left(TF-IDF_i^{\,2}\right)}}$$

$$\mu_{norm} = (\lambda_{norm_1}, \lambda_{norm_2}, \ldots, \lambda_{norm_m})$$

$$\mu = (TF-IDF_1, TF-IDF_2, \ldots, TF-IDF_m)$$

$$TF-IDF_i = tf_i * idf_i$$

$$tf_i = N(i \mid D)$$

$$idf_i = \log\left(\frac{n+1}{N(D \mid i)+1}\right) + 1$$

wherein, sen_vec is the to-be-decided sentence vector; $vec_i$ is the case word vector of the i-th case word; $\lambda_{norm_i}$ is the normalized TF-IDF weight value of the i-th case word; μ is the TF-IDF weight value vector for all case words; $\mu_{norm}$ is the normalized TF-IDF weight value vector for all case words; m is the number of all case words in the to-be-decided fishing event; $TF-IDF_i$ is the original TF-IDF weight value for the i-th case word; n is the number of the historical illegal fishing cases; $tf_i$ is the word frequency of case word i; $idf_i$ is the inverse word frequency of case word i; N(i|D) is the number of times the i-th case word appears in illegal fishing case D; N(D|i) is the number of illegal fishing cases containing the case word i.

In some possible implementations, before preprocessing the to-be-decided fishing event and the plurality of historical illegal fishing cases respectively based on the shore-based server, the method further comprising:

Based on the shore-based server, determining missing cases with data deficiencies among the plurality of historical illegal fishing cases, and removing the missing cases.

In some possible implementations, the cosine similarity model is:

$$\text{similarity} = \frac{\text{sen\_vec}_A \cdot \text{sen\_vec}_B}{\|\text{sen\_vec}_A\| \times \|\text{sen\_vec}_B\|}$$

wherein, $\text{sen\_vec}_A$ is the sentence vector of fishing case A; $\text{sen\_vec}_B$ is the sentence vector of fishing case B; || || is the symbol for modulo operation.

In some possible implementations, the shore-based server trains a penalty amount prediction model based on the illegal fishing case dataset, comprising:

- Determining a training subset from the illegal fishing case dataset; the training subset includes a plurality of historical illegal fishing cases;
- Determining feature attributes of each historical illegal fishing case based on a preset extraction rule;
- Encoding all branch results of the feature attributes to obtain label encoding;
- Training to obtain a to-be-pruned penalty amount prediction model based on the label encoding, a splitting index, and a stopping tree index;
- Determining a validation subset from the illegal fishing case dataset, and determining a plurality of subtrees of the to-be-pruned penalty amount prediction model;
- Calculating a pruning evaluation value for each subtree on the validation subset, then determining an evaluation standard value using cross-validation, subsequently checking each subtree one by one, and pruning the subtree if the pruning evaluation value of the entire tree after pruning this subtree is not higher than the pruning evaluation value of the entire tree before pruning; repeating this process until stable, to obtain the final penalty amount prediction model.

In some possible implementations, the to-be-pruned penalty amount prediction model includes a plurality of split points, and the plurality of historical illegal fishing cases are divided into a first subset and a second subset after passing through the split point, the splitting index is:

$$\sigma_n^2 = n_1 \times \sigma_1^2 + n_2 \times \sigma_2^2$$

$$\sigma_1^2 = \sum (y_i - c_1)^2$$

$$\sigma_2^2 = \sum (y_j - c_2)^2$$

where, $$\sigma_n^2$$

is the weighted squared error of the splitting point; $n_1$ is the number of cases in the first subset;

$$\sigma_1^2$$

is the squared error of the first subset; $n_2$ is the number of cases in the second subset;

$$\sigma_2^2$$

is the squared error of the second subset; $y_i$ is the output value of the i-th historical illegal fishing case in the first subset; $y_i$ is the output value of the j-th historical illegal fishing case in the second subset; $c_1$ is mean output of all historical illegal fishing cases in the first subset; $c_2$ is the mean output of all historical illegal fishing cases in the second subset.

In some possible implementations, the pruning evaluation index is:

$$C_\alpha(T) = C(T) + \alpha|T|$$

$$C(T) = \frac{1}{N}\sum_{a=1}^{N}(y_a - \hat{y}_a)^2$$

where, $C_\alpha(T)$ is the pruning evaluation value of the T-th subtree; C(T) is the mean square error obtained by running the validation subset in the T-th subtree; N is the number of samples in the T-th subtree; $y_\alpha$ is the true value of the α-th sample; $\hat{y}_\alpha$ is the predicted value of the α-th sample; |T| is the number of leaf nodes in the sub number; α is a complexity parameter used to balance the model's fitting ability and complexity.

In some possible implementations, after obtaining the penalty amount prediction model, the method further comprising:

- Determining a test subset from the illegal fishing case dataset;
- Inputting the test subset into the penalty amount prediction model to obtain a penalty amount prediction set corresponding to the test subset;
- Based on the penalty amount prediction set and the true penalty amount values in the test subset, determining whether the penalty amount prediction model meets requirements.

On the other hand, the present invention also provides an apparatus for penalty prediction and disposal decision of illegal fishing events, applied to a system composed of a shipborne terminal, a shipborne controller, and a shore-based server. The apparatus for penalty prediction and disposal decision of illegal fishing events, comprises:

- an illegal fishing case acquisition unit, configured to acquire a to-be-decided fishing event based on the shipborne terminal and obtain an illegal fishing case dataset stored in the shore-based server, where the illegal fishing case dataset includes a plurality of historical illegal fishing cases;
- a sentence vector determination unit, configured to preprocess the to-be-decided fishing event and the plurality of historical illegal fishing cases respectively based on the shore-based server, correspondingly obtaining a to-be-decided sentence vector and a plurality of historical sentence vectors;

a fishing case determination unit, configured to determine a plurality of similarity values between the to-be-decided sentence vector and the plurality of historical sentence vectors based on a cosine similarity model built into the shore-based server, and based on the plurality of similarity values, determine a target illegal fishing case corresponding to the to-be-decided fishing event from the plurality of historical illegal fishing cases;

a penalty amount prediction unit, configured to control the shore-based server to train a penalty amount prediction model based on the illegal fishing case dataset, and input the to-be-decided fishing event into the penalty amount prediction model to obtain a predicted penalty amount for the to-be-decided fishing event;

The shore-based server is configured to generate a first control instruction when the case similarity and the predicted penalty amount fall within a first grading threshold, generate a second control instruction when the case similarity and the predicted penalty amount fall within a second grading threshold, and generate a third control instruction when the case similarity and the predicted penalty amount fall within a third grading threshold;

The shipborne controller receives the first control instruction, the second control instruction, and the third control instruction, responds to the first control instruction by controlling a shipborne alarm system to issue a voice reminder, responds to the second control instruction by cutting off shipborne instrument equipment except those related to navigation and positioning, and responds to the third control instruction by cutting off shipborne instrument equipment except those related to navigation and positioning, and through law enforcement agencies, dispatching law enforcement vessels to forcibly interrupt the fishing activity.

The beneficial effects of the above embodiments are: The method and apparatus for penalty prediction and disposal decision of illegal fishing events provided by the present invention, by preprocessing the to-be-decided fishing event and the plurality of historical illegal fishing cases respectively to correspondingly obtain the to-be-decided sentence vector and the plurality of historical sentence vectors; based on the cosine similarity model, determining the plurality of similarity values between the to-be-decided sentence vector and the plurality of historical sentence vectors, and based on the plurality of similarity values, determining the target illegal fishing case corresponding to the to-be-decided fishing event from the plurality of historical illegal fishing cases, can obtain the target illegal fishing case with the highest similarity to the to-be-decided fishing event from the historical illegal fishing cases, provide decision information for the to-be-decided fishing event based on historical illegal fishing cases. Further, if there is no completely identical illegal fishing case, to ensure the rationality and effectiveness of the penalty amount for the to-be-decided fishing event, the present invention predicts the penalty amount for the to-be-decided fishing event through the penalty amount prediction model trained based on the illegal fishing case dataset, and takes corresponding disposal instructions based on the predicted penalty amount, thereby achieving effective crackdown and prevention of illegal fishing behaviors.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
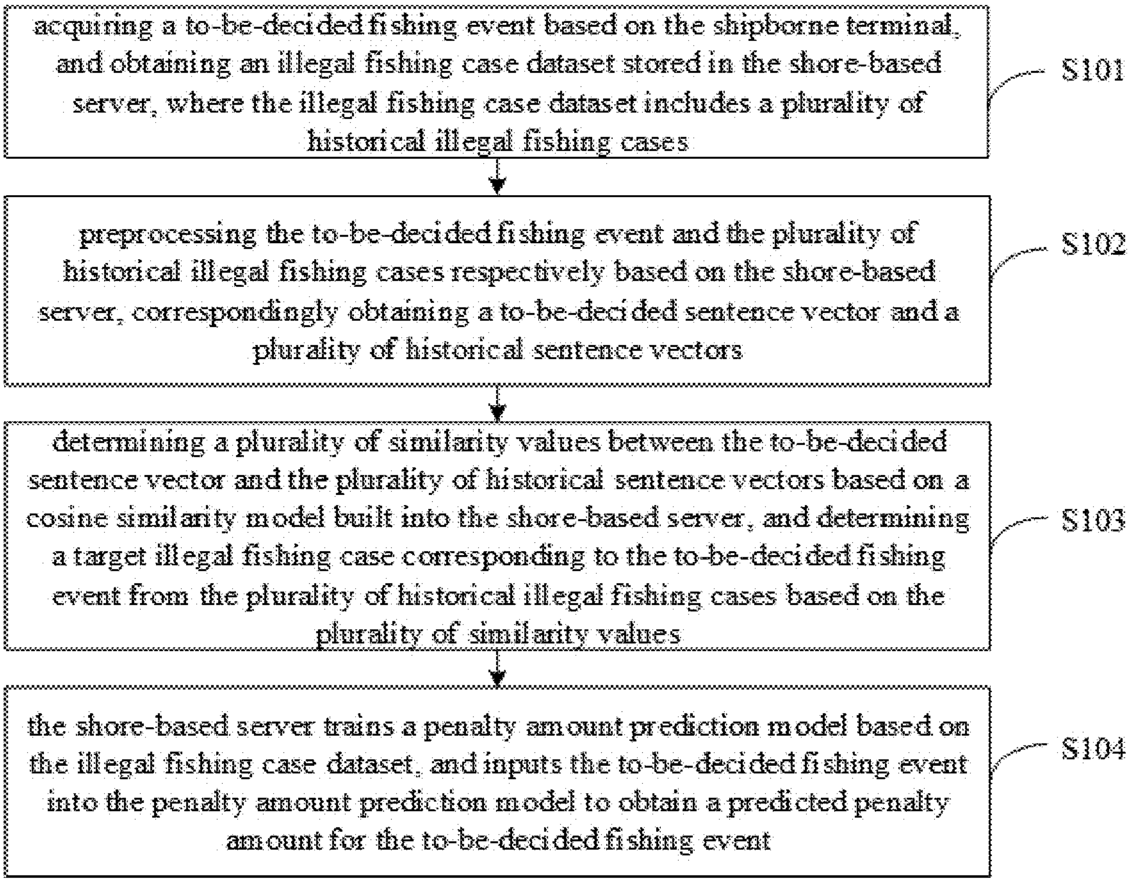
FIG. 1 is a flowchart of an embodiment of the method for penalty prediction and disposal decision of illegal fishing events provided by this disclosure.

The technical solutions in the embodiments of the present invention will be clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that the schematic drawings are not drawn to scale. The flowcharts illustrate operations implemented according to some embodiments of the present invention. It should be understood that the operations of the flowchart may be implemented not in order, and steps without logical contextual relationship may be reversed in order or implemented simultaneously. Furthermore, those skilled in the art, under the guidance of the present invention, may add one or more other operations to the flowchart, or remove one or more operations from the flowchart. Some block diagrams in the drawings are functional entities and do not necessarily correspond to physically or logically independent entities. These functional entities may be implemented in software form, or in one or more hardware modules or integrated circuits, or in different networks and/or processor systems and/or microcontroller systems.

The references "first", "second", involved in the embodiments of the present invention are for descriptive purposes only and should not be construed as indicating or implying relative importance or implicitly specifying the quantity of the indicated technical features. Thus, features defined with "first", "second" may explicitly or implicitly include at least one such feature.

Mention of "embodiment" in this document means that a particular feature, structure, or characteristic described in connection with the embodiment may be included in at least one embodiment of the present invention. The appearances of the phrase in various places in the specification are not necessarily all referring to the same embodiment, nor are separate or alternative embodiments mutually exclusive to other embodiments. Those skilled in the art explicitly and implicitly understand that the embodiments described herein may be combined with other embodiments.

The present invention provides a method and apparatus for penalty prediction and disposal decision of illegal fishing events, which are described below respectively.

FIG. 1 is a flowchart of an embodiment of the method for penalty prediction and disposal decision of illegal fishing events provided by the present invention. As shown in FIG. 1, the method applied to a system composed of a shipborne terminal, a shipborne controller, and a shore-based server, the method comprises:

S101, acquiring a to-be-decided fishing event based on the shipborne terminal, and obtaining an illegal fishing case dataset stored in the shore-based server, where the illegal fishing case dataset includes a plurality of historical illegal fishing cases.

Wherein, the to-be-decided fishing event is real-time fishing data. When the to-be-decided fishing event is multi-source time-series signals, including AIS, camera-identified fishing gear data, and sensor data from weighing sensors, it is necessary to align the multi-source time-series signals according to a time window. AIS information includes ship speed, latitude and longitude, course, MMSI. Camera-identified information includes fishing gear type, catch species. Weighing sensors include the weight of different fish species caught. The data type of the to-be-decided fishing event is converted to a text format based on the following processing method, such that the converted to-be-decided fishing event becomes text data: according to a predefined template (including fishing vessel information, fishing vessel behavior, fishing vessel equipment, fishing event, responsible entity, laws and regulations), a case description sentence is generated using a key-value pair method, and encoded into a sentence vector on the server side for similarity comparison with historical case data.

S102, preprocessing the to-be-decided fishing event and the plurality of historical illegal fishing cases respectively based on the shore-based server, correspondingly obtaining a to-be-decided sentence vector and a plurality of historical sentence vectors;

S103, determining a plurality of similarity values between the to-be-decided sentence vector and the plurality of historical sentence vectors based on a cosine similarity model built into the shore-based server, and determining a target illegal fishing case corresponding to the to-be-decided fishing event from the plurality of historical illegal fishing cases based on the plurality of similarity values;

S104, the shore-based server trains a penalty amount prediction model based on the illegal fishing case dataset, and inputs the to-be-decided fishing event into the penalty amount prediction model to obtain a predicted penalty amount for the to-be-decided fishing event.

The shore-based server is configured to generate a first control instruction when the case similarity and the predicted penalty amount fall within a first grading threshold, generate a second control instruction when the case similarity and the predicted penalty amount fall within a second grading threshold, and generate a third control instruction when the case similarity and the predicted penalty amount fall within a third grading threshold.

The shipborne controller receives the first control instruction, the second control instruction, and the third control instruction, controls a shipborne alarm system to issue a voice reminder in response to the first control instruction, cuts off shipborne instrument equipment except those related to navigation and positioning in response to the second control instruction, and cuts off shipborne instrument equipment except those related to navigation and positioning and, through a law enforcement agency, dispatches a law enforcement vessel to forcibly interrupt the fishing activity in response to the third control instruction.

Wherein, case similarity refers to the similarity value between the targeted illegal fishing case and the to-be-decided fishing event. The first grading threshold corresponds to a case similarity between 50% and 75% that passes significance verification and a predicted penalty amount percentile of less than 5% or greater than 95%, indicating that the to-be-decided case has medium similarity with historical illegal fishing cases but the penalty prediction result is a low-probability event, triggering the first control instruction; the second grading threshold corresponds to a case similarity between 75% and 95% that passes significance verification and a predicted penalty amount greater than the 5% percentile and less than the 95% percentile, indicating that the to-be-decided case has high and significant similarity with historical illegal cases and the penalty prediction result is not a low-probability event, requiring immediate disposition and cutting off related equipment; the third grading threshold corresponds to a case similarity greater than 95% that passes significance verification and a predicted penalty amount greater than the 5% percentile and less than the 95% percentile, the to-be-decided case is substantially identical to a historical illegal case, sending the third control signal, immediately cutting off related equipment and dispatching a law enforcement vessel for disposition.

Wherein, the setting of the first grading threshold, the second grading threshold, and the third grading threshold can be further adjusted based on actual application scenarios and historical case data patterns.

Although professional law enforcement officers can refer to legal provisions and classic cases to predict penaltys, their memory and knowledge storage are limited, typically mastering only hundreds of cases, and it is difficult to update in real time. However, the case database should have at least tens of millions of entries. Computers can store and process millions or even hundreds of millions more cases than law enforcement officers and can supplement new cases at any time, while humans need time to learn and adapt to new regulations. Computers can store and process millions of times more cases than law enforcement officers and use precise mathematical models for prediction, while humans rely on empirical fuzzy judgment, which is prone to misjudgment.

It should be noted that the penalty amount prediction model can be a model trained offline by the shore-based server. After training, it is placed in the shore-based server. When executing S104, the pre-trained penalty amount prediction model is called, and incremental learning is performed based on existing cases, enabling real-time prediction of penalty amounts.

Compared with the prior art, the method for penalty prediction and disposal decision of illegal fishing events obtains a to-be-decided sentence vector and a plurality of historical sentence vectors by preprocessing the to-be-decided fishing event and the plurality of historical illegal fishing cases respectively; determines a plurality of similarity values between the to-be-decided sentence vector and the plurality of historical sentence vectors based on the cosine similarity model, and determines the target illegal fishing case corresponding to the to-be-decided fishing event from the plurality of historical illegal fishing cases based on the plurality of similarity values, thereby obtaining a set of target illegal fishing cases with high similarity to the to-be-decided fishing event that pass significance verification from the historical illegal fishing cases, thus further providing disposition information for the to-be-decided fishing event based on historical illegal fishing cases. Specifically, to ensure that the penalty amount for the to-be-decided fishing event can be obtained timely, the embodiments of the present invention predict the penalty amount for the to-be-decided fishing event through the penalty amount prediction model trained based on the illegal fishing case dataset, and generate disposition instructions based on the similarity between the to-be-decided case and historical cases and the predicted penalty amount, facilitating timely response by the shipborne controller and achieving effective crackdown and prevention of illegal fishing activities.

Wherein, the specific process of acquiring the illegal fishing case dataset in S101 is: retrieving and downloading from big data publicly released on relevant websites through the network interface of the shore-based server, to obtain and store the illegal fishing case dataset.

Wherein, the illegal fishing case dataset includes, but is not limited to, the following information of illegal fishing cases: 1) Basic information, such as case publication year, region; 2) Illegal fishing-related information, such as fishing method, mesh size, catch weight, and case value; 3) Ecological damage restoration information, such as compensation amount, restoration measures; 4) Illegal fishing vessel information, responsible entity, basis for disposition.

It should be noted that in S103, the target illegal fishing case is a historical illegal fishing case whose similarity value with the to-be-decided fishing event is higher than a similarity threshold.

In a specific embodiment of the present invention, the similarity threshold is greater than 50% and the similarity calculation passes significance verification.

Figure 2:
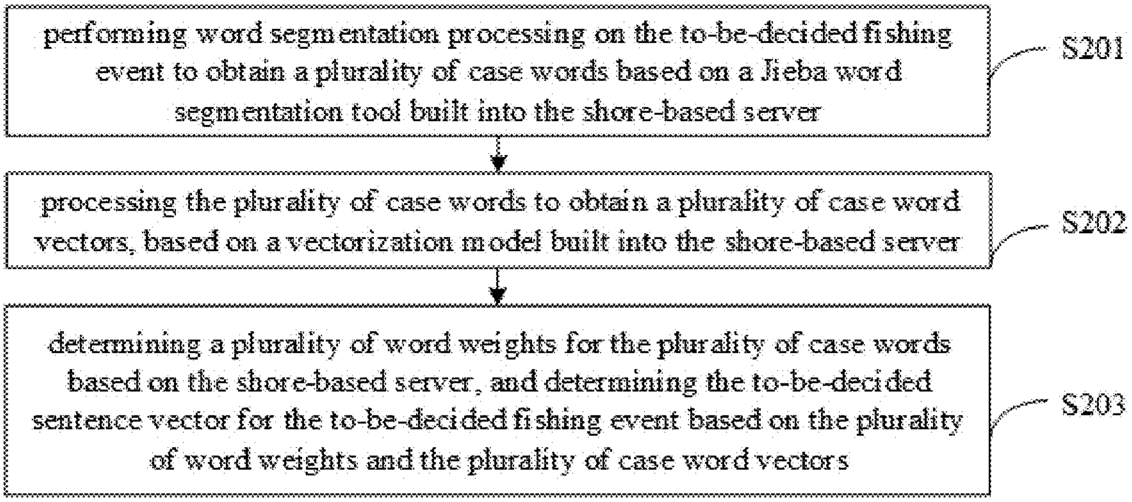
FIG. 2 is a flowchart illustrating an embodiment of obtaining a sentence vector in S102 of FIG. 1 of this disclosure.

In some embodiments of the present invention, the data type of the to-be-decided fishing event is text data; then as shown in FIG. 2, preprocessing the to-be-decided fishing event to obtain the to-be-decided sentence vector in S102, comprises:

S201, performing word segmentation processing on the to-be-decided fishing event to obtain a plurality of case words based on a Jieba word segmentation tool built into the shore-based server.

Wherein, the Jieba word segmentation tool is pre-stored in the shore-based server. When S201 is executed, the Jieba word segmentation tool is called.

S202, processing the plurality of case words to obtain a plurality of case word vectors, based on a vectorization model built into the shore-based server.

Similarly, the vectorization model is pre-stored in the shore-based server. When S202 is executed, the vectorization model is called.

S203, determining a plurality of word weights for the plurality of case words based on the shore-based server, and determining the to-be-decided sentence vector for the to-be-decided fishing event based on the plurality of word weights and the plurality of case word vectors.

It should be noted that to ensure the accuracy of the word segmentation processing in S201, before executing S201, the following three types of processing are performed in the Jieba word segmentation tool: 1) Adding a dictionary containing professional terms related to maritime law enforcement and vessel fishing; 2) Stop word filtering; 3) Using precise mode for word segmentation.

Wherein, the vectorization model in S202 can be a Word2Vec model.

It should be understood that the method and steps for preprocessing the plurality of historical illegal fishing cases in S102 are the same as those for preprocessing the to-be-decided fishing event, which can be referred to the above S201-S203, and will not be repeated here.

In some embodiments of the present invention, the to-be-decided sentence vector is:

$$\text{sen\_vec} = \frac{\sum_{i}^{m} vec_i * \lambda_{norm_i}}{m}$$

$$\mu_{norm} = \frac{\mu}{\sqrt{\sum_{i=1}^{m} \left(TF-IDF_i^2\right)}}$$

$$\mu_{norm} = \left(\lambda_{norm_1}, \lambda_{norm_2}, \ldots , \lambda_{norm_m}\right)$$

$$\mu = (TF-IDF_1, TF-IDF_2, \ldots , TF-IDF_m)$$

$$TF-IDF_i = tf_i * idf_i$$

$$tf_i = N(i \mid D)$$

$$idf_i = \log\left(\frac{n+1}{N(D \mid i)+1}\right) + 1$$

sen_vec is the to-be-decided sentence vector; $vec_i$ is the case word vector of the i-th case word; $\lambda_{norm_i}$ is the normalized TF-IDF weight value of the i-th case word; μ is the TF-IDF weight value vector for all case words; $\mu_{norm}$ is the normalized TF-IDF weight value vector for all case words; m is the number of all case words in the to-be-decided fishing event; $TF-IDF_i$ is the original TF-IDF weight value for the i-th case word; n is the number of the historical illegal fishing cases; $tf_i$ is the word frequency of case word i; $idf_i$ is the inverse word frequency of case word i; N(i|D) is the number of times the i-th case word appears in illegal fishing case D; N(D|i) is the number of illegal fishing cases containing the case word i.

Since data in historical illegal fishing cases may be missing, if missing data is imputed, it is based on subjective human estimates and may not fully conform to objective facts. To ensure the authenticity and validity of historical cases and avoid the impact of unreasonable data imputation on disposition decision results, in some embodiments of the present invention, before S102, the method further comprises:

Based on the shore-based server, missing cases with data deficiencies among the plurality of historical illegal fishing cases are identified, and these missing cases are removed.

Specifically, the shore-based server stores missing detection rules. Prior to S102, the stored missing detection rules are invoked to detect whether data is missing in the historical illegal fishing cases.

The specific detection rules include determining the existence of key fields such as fishing vessel information, fishing vessel behavior, fishing vessel equipment, fishing event, responsible entity, penalty amount, laws and regulations, and also include specific values corresponding to thresholds.

By removing the missing cases, the embodiments of the present invention ensure that only data fully consistent with objective facts is used for disposal decision, thereby improving the accuracy of the disposal decision.

In some embodiments of the present invention, the cosine similarity model is:

$$\text{similarity} = \frac{\text{sen\_vec}_A \cdot \text{sen\_vec}_B}{\|\text{sen\_vec}_A\| \times \|\text{sen\_vec}_B\|}$$

wherein, $\text{sen\_vec}_A$ is the sentence vector of fishing case A; $\text{sen\_vec}_B$ is the sentence vector of fishing case B; || is the symbol for modulo operation.

Wherein, $\text{sen\_vec}_A$ and $\text{sen\_vec}_B$ are both high-dimensional vectors, assuming 100 dimensions, requiring 10,000 multiplications, 10,000 additions, and one square root operation, while humans can typically only consider 3 to 4 factors for case matching. Therefore, compared to humans judging similarity based on subjective experience, which leads to fuzzy similarity results, the embodiments of the present invention quantify the similarity value by constructing vectors, improving the accuracy of similarity judgment.

Figure 3:
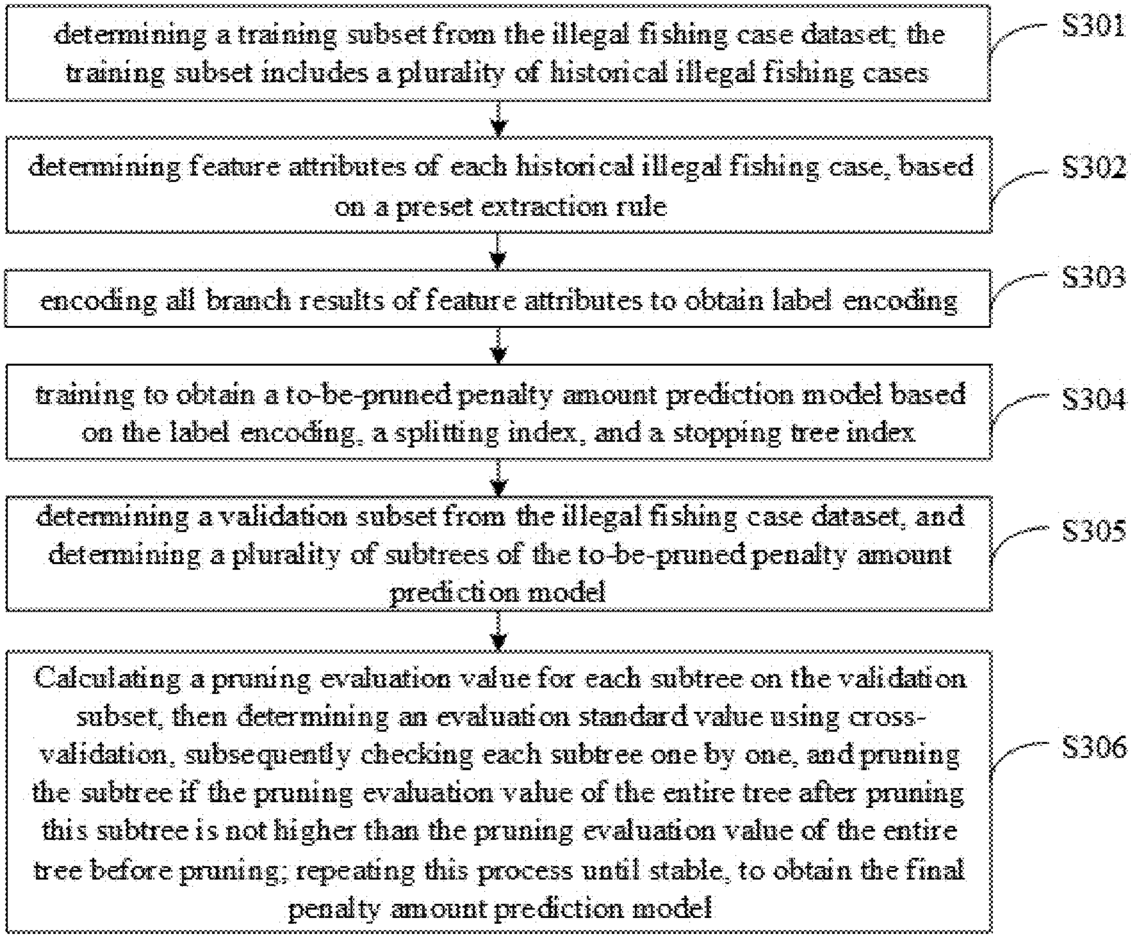
FIG. 3 is a flowchart of an embodiment of constructing the penalty amount prediction model provided by this disclosure.

In some embodiments of this disclosure, as shown in FIG. 3, in S104, the shore-based server trains a penalty amount prediction model based on the illegal fishing case dataset in S104, comprises:

S301, determining a training subset from the illegal fishing case dataset; the training subset includes a plurality of historical illegal fishing cases.

Wherein, the shore-based server has a functional module for randomly selecting data. Based on this functional module, data is selected from the illegal fishing case dataset to obtain the training subset.

S302, determining feature attributes of each historical illegal fishing case, based on a preset extraction rule.

Wherein, the to-be-decided case includes operational details during fishing obtained based on image acquisition units such as cameras or visual processing units, such as fishing gear usage, caught fish species, as well as the weight of the catch obtained based on weight sensors, and the vessel's position determined based on AIS/GPS/Beidou systems. The operational details during fishing, catch weight, vessel position, fishing behavior, etc., are all used as feature attributes.

For a historical case text S, a regular pattern $P_{h,j}$ is preset for each value 1 ("electrofishing, pounding, cormorant fishing, other") of each feature h ("fishing behavior"). When the text matches this pattern, that value is determined; if no pattern is matched, it is recorded as "other".

Wherein, the formula for the preset extraction rule is:

$$\hat{k}_h = \underset{k}{\operatorname{argmax}}\, 1(\text{match}(p_{h,l}, S))$$

Wherein, match $(P_{h,i}, S)=1$ indicates that "text S contains at least one segment that can be matched by the regular expression $P_{h,j}$", otherwise it is 0; 1 (•) is the indicator function.

S303, encoding all branch results of feature attributes to obtain label encoding;

S304, training to obtain a to-be-pruned penalty amount prediction model based on the label encoding, a splitting index, and a stopping tree index;

S305, determining a validation subset from the illegal fishing case dataset, and determining a plurality of subtrees of the to-be-pruned penalty amount prediction model;

S306, calculating a pruning evaluation value for each subtree on the validation subset, which comprehensively considers validation set error and complexity factors such as the number of leaf nodes; then determining an evaluation standard value using cross-validation, dividing the training data into K parts, taking one part as the validation set in turn, using the formula "comprehensive index=validation set error+α×number of leaf nodes" to evaluate the model for each fold and taking the K-fold average of this index, selecting the α* that minimizes this average comprehensive index from a set of candidate α as the evaluation standard value. Then, check each subtree one by one, and if the pruning evaluation value of the entire tree after pruning this subtree is not higher than the pruning evaluation value of the entire tree before pruning, prune it; repeat this process until stable, to obtain the final penalty amount prediction model.

The embodiments of the present invention avoid overfitting of the penalty amount prediction model and improve its generalization ability by performing pruning processing on the to-be-pruned penalty amount prediction model based on the validation subset to obtain the penalty amount prediction model.

In other words, the penalty amount prediction model in the embodiments of the present invention is a tree model, and its training process based on the label encoding, splitting index, and stopping tree index is the training process of the penalty amount prediction model.

In a specific embodiment of the present invention, S302 specifically comprises: extracting the following seven feature attributes: 1) Whether rare fish species are caught? Branch results are the following two: 1. Yes, 2. No. 2) Fishing gear used? Branch results are the following three: 1. Nets with mesh size smaller than regulations or bottom trawls, 2. Pole-and-line or overly efficient fishing tools, 3. Other. 3) Fishing method adopted? Branch results are the following four: 1. Electrofishing, poison fishing, blast fishing, 2. Pounding operation, 3. Using cormorants for fishing, 4. Other. 4) Fishing water area? Branch results are the following three: 1. Marine waters, 2. Inland waters, 3. Protected basins like the Yangtze River. 5) Whether a fishing license is held? Branch results are the following two: 1. Yes, 2. No. 6) Whether vessel navigation documents are held? Branch results are the following two: 1. Yes, 2. No. 7) Amount of catch? Branch results are the following three: 1. Piece-level (small amount), 2. Kilogram-level (moderate amount), 3. Ton-level (large amount).

Among them, S303 specifically comprises: dividing the above seven feature attributes into 19 types according to their branch results for selecting split nodes of the to-be-pruned penalty amount prediction model. The encoding method is one-hot encoding, performing one-hot encoding on the seven features separately, each feature forming a separate set of vectors, with only the position corresponding to the branch being 1 and the rest 0; then concatenating the seven sets of vectors in a fixed order to form a vector group. The 19 branch results are specifically: the first feature attribute has two branch results (yes or no), the second feature attribute has three branch results, and so on, summing the branch results of the seven feature attributes gives a total of 19 branch results.

It should be noted that S304 specifically comprises: using the label encodings as different splitting points, determining splitting index value for each splitting point based on the splitting index, using the splitting point corresponding to the minimum splitting index value as the actual splitting point, and so on, to construct the to-be-pruned penalty amount prediction model.

In some embodiments of this disclosure, multiple historical illegal fishing cases are divided into a first subset and a second subset by the splitting points, and the splitting index is:

$$\sigma_n^2 = n_1 \times \sigma_1^2 + n_2 \times \sigma_2^2$$
$$\sigma_1^2 = \sum (y_i - c_1)^2$$
$$\sigma_2^2 = \sum (y_j - c_2)^2$$

where, $$\sigma_n^2$$

is the weighted squared error of the splitting point; $n_1$ is the number of cases in the first subset;

$$\sigma_1^2$$

is the squared error of the first subset; $n_2$ is the number of cases in the second subset;

$$\sigma_2^2$$

is the error of the second subset; $y_i$ is the output value of the i-th historical illegal fishing case in the first subset; $y_j$ is the output value of the j-th historical illegal fishing case in the second subset; $c_1$ is mean output of all historical illegal fishing cases in the first subset; $c_2$ is the mean output of all historical illegal fishing cases in the second subset.

Wherein, in the tree generation phase of S304, pre-pruning is adopted, using the minimum number of samples per node as the stopping tree indicator. Since nodes with too few samples are prone to being affected by random noise, leading to overfitting and weakened generalization capability, when a proposed split at a node would result in the number of samples in any child node being less than or equal to the minimum leaf samples, further splitting at that node is stopped immediately.

In the specific embodiment of present invention, the pruning evaluation index is:

$$C_\alpha(T) = C(T) + \alpha|T|$$
$$C(T) = \frac{1}{N}\sum_{a=1}^{N} (y_a - \hat{y}_a)^2$$

where, $C_\alpha(T)$ is the pruning evaluation value of the T-th subtree; C(T) is the mean square error obtained by running the validation subset in the T-th subtree; N is the number of samples in the T-th subtree; $y_\alpha$ is the true value of the α-th sample; $\hat{y}_\alpha$ is the predicted value of the α-th sample; |T| is the number of leaf nodes in the sub number; α is a complexity parameter used to balance the model's fitting ability and complexity The process for determining the complexity parameter is: validating based on the following cross-validation formula, obtaining α as the α used in the pruning evaluation index calculation formula:

$$\alpha *= \underset{\alpha}{\text{argmin}} \frac{1}{K}\sum_{k=1}^{K} C_\alpha\left(T^{(k)}\right)$$

Wherein, K represents dividing the data into K parts (K-fold); $T^{(k)}$ represents the tree (or candidate subtree) obtained under the k-th fold and evaluated on the corresponding validation fold;

$$\frac{1}{K}\sum_{k=1}^{K}.$$

represents averaging the evaluation values of the K validations.

Figure 4:
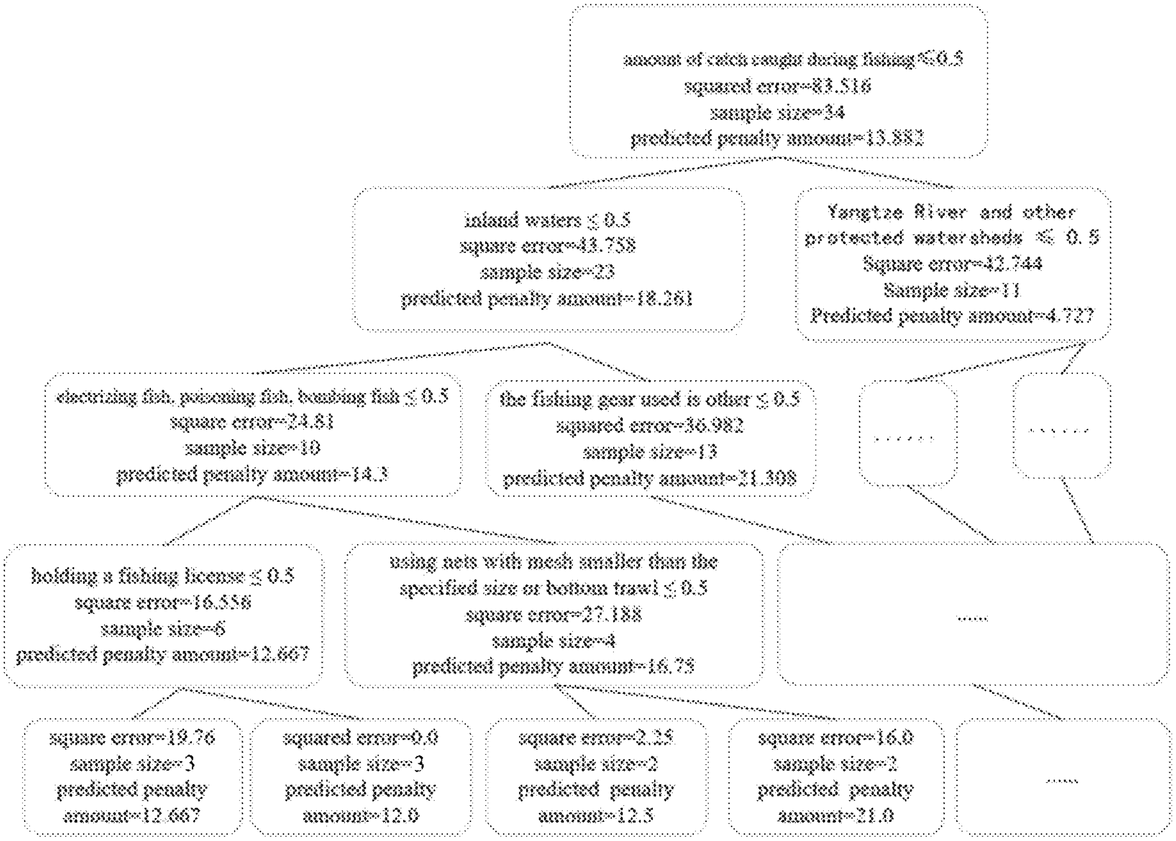
FIG. 4 is a schematic diagram of the structure of an embodiment of the penalty amount prediction model provided by this disclosure.

In a specific embodiment of the present invention, as shown in FIG. 4 (some nodes are not shown in the figure, replaced by ellipses), the training process of the penalty amount prediction model is: The original data volume is 43 case data entries, divided into a training set (34 entries) and a test set (9 entries). The tree generation phase uses pre-pruning, with the “minimum leaf samples” as the sole stopping tree index; in this embodiment, it is preset to 3, meaning that if any candidate split would cause the number of samples in either the left or right child node to be less than 3, that split is not executed, and the node directly becomes a leaf. Based on the calculation of the splitting index value (squared error), the root node selects whether the catch amount is at the kilogram-level (moderate amount). The training set branches through a binary structure, with data cases where the catch amount is at the kilogram-level flowing into the left child node, and the decision basis is selected as whether the fishing water area is marine waters, totaling 23 case data entries. Data cases where the catch amount is not at the kilogram-level flow into the right child node, and the decision basis is selected as whether the fishing water area is inland waters, totaling 11 case data entries. Based on each new child node, the squared error for all label encodings is recalculated, and the label that minimizes it is selected for further division; this division is only executed if it satisfies the condition that the number of samples in both left and right child nodes is not less than or equal to 3; otherwise, it stops at the current node and outputs it as a leaf.

Under this stopping rule, some branches may stop early due to insufficient samples (a candidate split would produce a child node with 2 samples, then this split is not executed); other branches continue to divide according to the principle of minimizing squared error until no feasible split exists that satisfies the stopping constraint and can bring effective error reduction.

Figure 5:
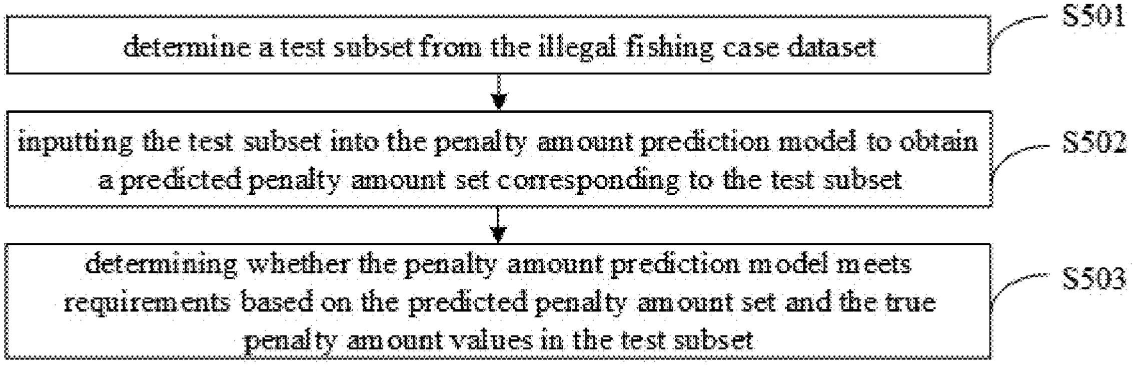
FIG. 5 is a schematic diagram of an embodiment of evaluating the penalty amount prediction model provided by this disclosure.

To test the accuracy of the penalty amount prediction model constructed for this disclosure, in some embodiments, as shown in FIG. 5, after S306, the method further comprising:

S501, determine a test subset from the illegal fishing case dataset.

Similarly, the test subset is obtained by selecting data from the illegal fishing case dataset using the functional module for random selection in the shore-based server.

S502, inputting the test subset into the penalty amount prediction model to obtain a predicted penalty amount set corresponding to the test subset.

S503, determining whether the penalty amount prediction model meets requirements based on the predicted penalty amount set and the true penalty amount values in the test subset.

Wherein, S503 specifically comprises: when the absolute difference between the true penalty amount value and the predicted penalty amount value is greater than an adaptive threshold, determining that the penalty amount prediction model does not meet requirements and needs retraining; when the absolute difference is less than or equal to the adaptive threshold, determining that the model meets requirements and can be used for actual prediction.

The adaptive threshold is not set subjectively by humans but is determined by data. Specifically: first, divide a validation subset from the historical samples, statistically analyze the distribution of the "absolute error between true value and predicted value", use a fixed quantile of this distribution as the threshold, and periodically review and update it for newly added data using the same method during subsequent operation.

Figure 6:
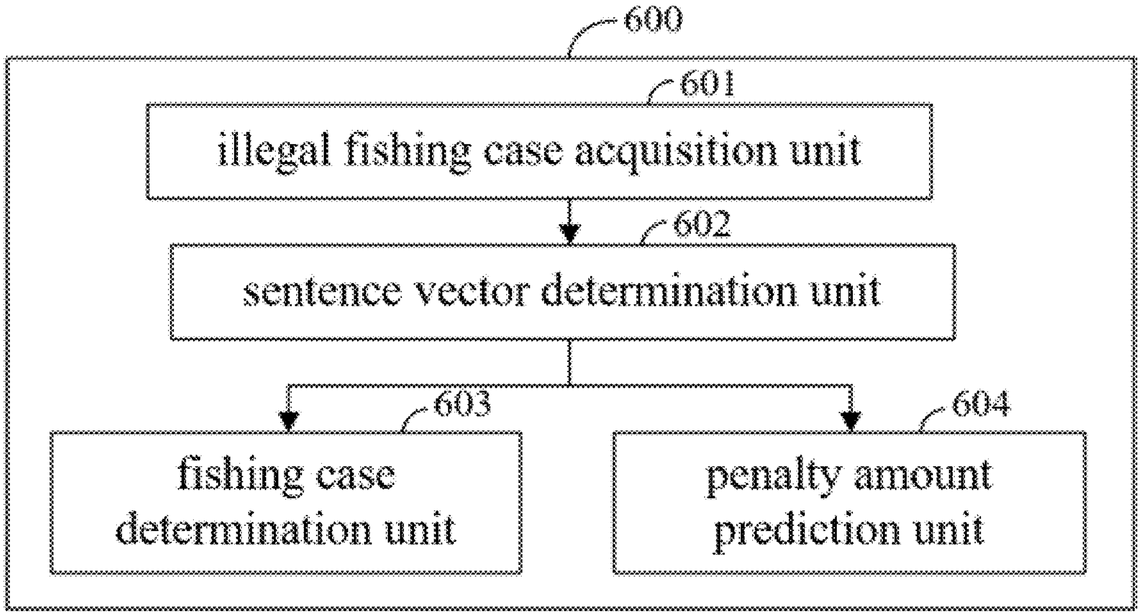
FIG. 6 is a schematic diagram of an embodiment of the apparatus for penalty prediction and disposal decision of illegal fishing events provided by this disclosure.

To better implement the method for penalty prediction and disposal decision of illegal fishing events in the embodiments of the present invention, the embodiments of the present invention further provide an apparatus for penalty prediction and disposal decision of illegal fishing events, applied to a system composed of a shipborne terminal, a shipborne controller, and a shore-based server. As shown in FIG. 6, the apparatus 600 comprises:

An illegal fishing case acquisition unit 601, configured to acquire a to-be-decided fishing event based on the shipborne terminal, and acquire an illegal fishing case dataset stored in the shore-based server, the illegal fishing case dataset including a plurality of historical illegal fishing cases;

A sentence vector determination unit 602, configured to preprocess the to-be-decided fishing event and the plurality of historical illegal fishing cases based on the shore-based server, correspondingly obtaining a to-be-decided sentence vector and a plurality of historical sentence vectors;

A fishing case determination unit 603, configured to determine a plurality of similarity values between the to-be-decided sentence vector and the plurality of historical sentence vectors based on a cosine similarity model built into the shore-based server, and determine a target illegal fishing case corresponding to the to-be-decided fishing event from the plurality of historical illegal fishing cases based on the plurality of similarity values;

A penalty amount prediction unit 604, configured to control the shore-based server to obtain a penalty amount prediction model by training based on the illegal fishing case dataset, and input the to-be-decided fishing event into the penalty amount prediction model to obtain a predicted penalty amount for the to-be-decided fishing event;

The shore-based server is configured to generate a first control instruction when the case similarity and the predicted penalty amount fall within a first grading threshold, generate a second control instruction when the case similarity and the predicted penalty amount fall within a second grading threshold, and generate a third control instruction when the case similarity and the predicted penalty amount fall within a third grading threshold;

The shipborne controller receives the first control instruction, the second control instruction, and the third control instruction, controls a shipborne alarm system to issue a voice reminder in response to the first control instruction, cuts off shipborne instrument equipment except those related to navigation and positioning in response to the second control instruction, and in response to the third control instruction, besides cutting off equipment, also, through a law enforcement agency, dispatches a law enforcement vessel to forcibly interrupt the fishing activity.

The above-described apparatus 600 for penalty prediction and disposal decision of illegal fishing events can implement the technical scheme described in the method embodiments of penalty prediction and disposal decision of illegal fishing events. The specific implementation principles of the above modules or units can be referred to the corresponding content in the method embodiments of penalty prediction and disposal decision of illegal fishing events, and will not be repeated here.

Figure 7:
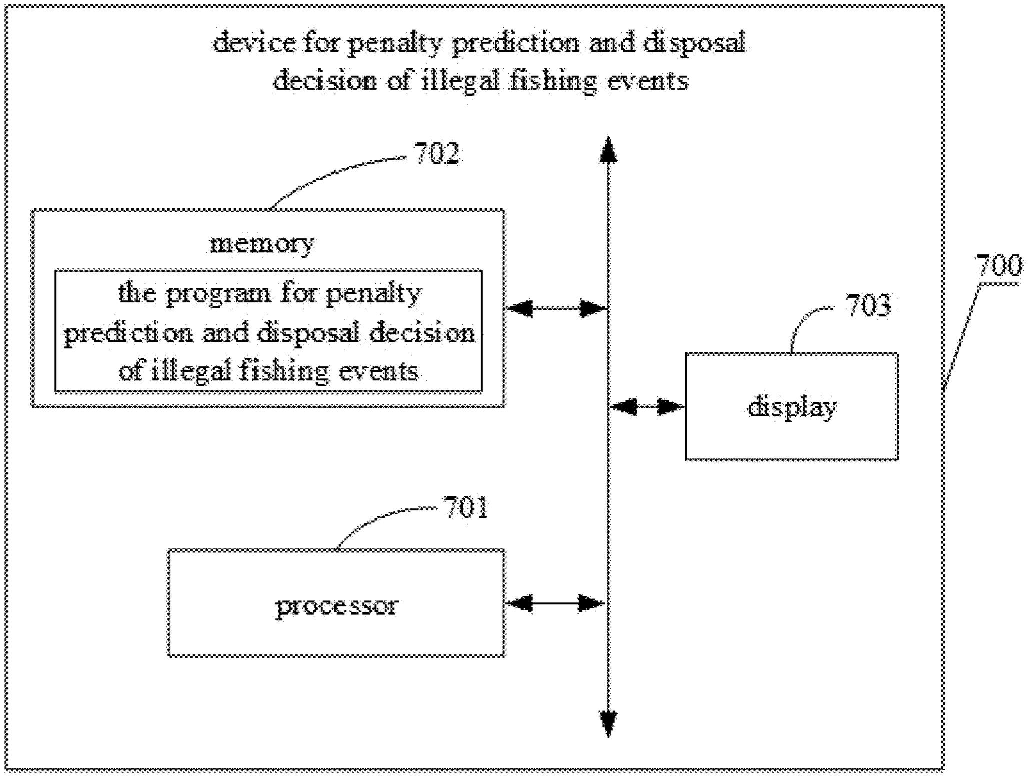
FIG. 7 is a schematic diagram of an embodiment of the device for penalty prediction and disposal decision of illegal fishing events provided by this disclosure.

As shown in FIG. 7, the present invention further provides a device 700 for penalty prediction and disposal decision of illegal fishing events. The device 700 comprises a processor 701, a memory 702, and a display 703. FIG. 7 only shows part of the components of the device 700, but it should be understood that not all shown components are required to be implemented, and more or fewer components may be implemented alternatively.

The processor 701 in some embodiments may be a Central Processing Unit (CPU), a microprocessor, or other data processing chip, for running program code stored in the memory 702 or processing data, such as the method for penalty prediction and disposal decision of illegal fishing events of the present invention.

In some embodiments, the processor 701 may be a single server or a server group. The server group may be centralized or distributed. In some embodiments, the processor 701 may be local or remote. In some embodiments, the processor 701 may be implemented on a cloud platform. In one embodiment, the cloud platform may include a private cloud, public cloud, hybrid cloud, community cloud, distributed cloud, inter-cloud, multi-cloud, etc., or any combination thereof.

The memory 702 in some embodiments may be an internal storage unit of the device 700, such as a hard disk or memory of the device 700. The memory 702 in other embodiments may also be an external storage device of the device 700, such as a plug-in hard disk equipped on the device 700, a Smart Media Card (SMC), a Secure Digital (SD) card, a Flash Card.

Furthermore, the memory 702 may include both the internal storage unit of the device 700 and the external storage device. The memory 702 is used for storing application software installed on the device 700 and various data.

The display 703 in some embodiments may be an LED display, liquid crystal display, touch liquid crystal display, and OLED (Organic Light-Emitting Diode) touchscreen. The display 703 is used for displaying information of the device 700 and for displaying a visual user interface. The components 701-703 of the device 700 communicate with each other through a system bus.

In one embodiment, when the processor 701 executes the program for penalty prediction and disposal decision of illegal fishing events stored in the memory 702, the following steps are implemented:

acquiring a to-be-decided fishing event based on the shipborne terminal, and acquiring an illegal fishing case dataset stored in the shore-based server, the illegal fishing case dataset including a plurality of historical illegal fishing cases;

preprocessing the to-be-decided fishing event and the plurality of historical illegal fishing cases based on the shore-based server, correspondingly obtaining a to-be-decided sentence vector and a plurality of historical sentence vectors;

determining a plurality of similarity values between the to-be-decided sentence vector and the plurality of historical sentence vectors based on a cosine similarity model built into the shore-based server, and determining a target illegal fishing case corresponding to the to-be-decided fishing event from the plurality of historical illegal fishing cases based on the plurality of similarity values;

The shore-based server obtaining a penalty amount prediction model by training based on the illegal fishing case dataset, and inputting the to-be-decided fishing event into the penalty amount prediction model to obtain a predicted penalty amount for the to-be-decided fishing event;

The shore-based server generating a first control instruction when the case similarity and the predicted penalty amount fall within a first grading threshold, generating a second control instruction when the case similarity and the predicted penalty amount fall within a second grading threshold, and generating a third control instruction when the case similarity and the predicted penalty amount fall within a third grading threshold;

The shipborne controller receiving the first control instruction, the second control instruction, and the third control instruction, controlling a shipborne alarm system to issue a voice reminder in response to the first control instruction, cutting off shipborne instrument equipment except those related to navigation and positioning in response to the second control instruction, and in response to the third control instruction, besides cutting off equipment, also, through a law enforcement agency, dispatching a law enforcement vessel to forcibly interrupt the fishing activity.

It should be understood that when the processor 701 executes the program for penalty prediction and disposal decision of illegal fishing events stored in the memory 702, in addition to the above functions, it can also implement other functions, which can be referred to the description in the preceding method embodiments.

Correspondingly, an embodiment of the present application further provides a computer-readable storage medium. The computer-readable storage medium is used for storing a computer-readable program or instruction. When the program or instruction is executed by a processor, it can implement the steps or functions of the method for penalty prediction and disposal decision of illegal fishing events provided in the various method embodiments.

Those skilled in the art can understand that implementing all or part of the processes of the methods in the above embodiments can be accomplished by a computer program instructing relevant hardware (such as a processor, controller, etc.). The computer program can be stored in a computer-readable storage medium. The computer-readable storage medium can be a magnetic disk, an optical disk, a Read-Only Memory (ROM), or a Random-Access Memory (RAM).

The method and apparatus for penalty prediction and disposal decision of illegal fishing events provided by the present invention have been described in detail above. Specific examples are used in this document to explain the principles and implementations of the present invention. The description of the above embodiments is only used to help understand the method and core ideas of the present invention. Meanwhile, for those skilled in the art, based on the ideas of the present invention, there may be changes in the specific implementation and application scope. In summary, the content of this specification should not be construed as limiting the present invention.

What is claimed is:

1. Method for penalty prediction and disposal decision of illegal fishing events, applied to a system composed of a shipborne terminal, a shipborne controller, and a shore-based server, the method comprising:

acquiring a to-be-decided fishing event based on the shipborne terminal, and obtaining an illegal fishing case dataset stored in the shore-based server, where the illegal fishing case dataset including a plurality of historical illegal fishing cases;

preprocessing the to-be-decided fishing event and the plurality of historical illegal fishing cases based on the shore-based server, correspondingly obtaining a to-be-decided sentence vector and a plurality of historical sentence vectors;

determining a plurality of similarity values between the to-be-decided sentence vector and the plurality of historical sentence vectors based on a cosine similarity model built into the shore-based server, and determining a target illegal fishing case corresponding to the to-be-decided fishing event from the plurality of historical illegal fishing cases based on the plurality of similarity values;

the shore-based server trains a penalty amount prediction model based on the illegal fishing case dataset, and inputs the to-be-decided fishing event into the penalty amount prediction model to obtain a predicted penalty amount for the to-be-decided fishing event;

the shore-based server is configured to generate a first control instruction when the case similarity and the predicted penalty amount fall within a first grading threshold, generating a second control instruction when the case similarity and the predicted penalty amount fall within a second grading threshold, and generating a third control instruction when the case similarity and the predicted penalty amount fall within a third grading threshold;

the shipborne controller receives the first control instruction, the second control instruction, and the third control instruction, responds to the first control instruction by controlling a shipborne alarm system to issue a voice reminder, responds to the second control instruction by cutting off shipborne instrument equipment except those related to navigation and positioning, and responds to the third control instruction by cutting off shipborne instrument equipment except those related to navigation and positioning, and through law enforcement agencies, dispatching law enforcement vessels to forcibly interrupt the fishing activity;

wherein the data type of the to-be-decided fishing event is text data; then preprocessing the to-be-decided fishing event to obtain the to-be-decided sentence vector comprises:

performing word segmentation processing on the to-be-decided fishing event based on a Jieba word segmentation tool built into the shore-based server, to obtain a plurality of case words;

processing the plurality of case words based on a vectorization model built into the shore-based server, to obtain a plurality of case word vectors;

determining a plurality of word weights for the plurality of case words based on the shore-based server, and determining the to-be-decided sentence vector for the to-be-decided fishing event based on the plurality of word weights and the plurality of case word vectors;

wherein the shore-based server trains a penalty amount prediction model based on the illegal fishing case dataset, comprises:

determining a training subset from the illegal fishing case dataset; the training subset includes a plurality of historical illegal fishing cases;

determining feature attributes for each historical illegal fishing cases based on a preset extraction rule;

encoding all branch results of the feature attributes to obtain label encoding;

training to obtain a to-be-pruned penalty amount prediction model based on the label encoding, a splitting index, and a stopping tree index;

determining a validation subset from the illegal fishing case dataset, and determining a plurality of subtrees of the to-be-pruned penalty amount prediction model;

calculating a pruning evaluation value for each subtree on the validation subset, then determining an evaluation standard value using cross-validation, subsequently checking each subtree one by one, and pruning the subtree if the pruning evaluation value of the entire tree after pruning this subtree is not higher than the pruning evaluation value of the entire tree before pruning; repeating this process until stable, to obtain the penalty amount prediction model;

wherein the to-be-pruned penalty amount prediction model includes a plurality of split points, and the plurality of historical illegal fishing cases are divided into a first subset and a second subset after passing through a split point, then the splitting index is:

$$\sigma_n^2 = n_1 \times \sigma_1^2 + n_2 \times \sigma_2^2$$

$$\sigma_1^2 = \sum (y_i - c_1)^2$$

$$\sigma_2^2 = \sum (y_j - c_2)^2$$

where, $$\sigma_n^2$$

is the weighted squared error of the splitting point; $n_1$ is the number of cases in the first subset;

$$\sigma_1^2$$

is the squared error of the first subset; $n_2$ is the number of cases in the second subset;

$$\sigma_2^2$$

is the squared error of the second subset; $y_i$ is the output value of the i-th historical illegal fishing case in the first subset; $y_j$ is the output value of the j-th historical illegal fishing case in the second subset; $c_1$ is mean output of all historical illegal fishing cases in the first subset; $c_2$ is the mean output of all historical illegal fishing cases in the second subset;

the pruning evaluation index is:

$$C_\alpha(T) = C(T) + \alpha|T|$$

$$C(T) = \frac{1}{N}\sum_{a=1}^{N}(y_a - \hat{y}_a)^2$$

where, $C_\alpha(T)$ is the pruning evaluation value of the T-th subtree; C(T) is the mean square error obtained by running the validation subset in the T-th subtree; N is the number of samples in the T-th subtree; $y_\alpha$ is the true value of the α-th sample; $\hat{y}_\alpha$ is the predicted value of the α-th sample; |T| is the number of leaf nodes in the sub number; α is a complexity parameter used to balance the model's fitting ability and complexity;

wherein the stopping tree indicator is the minimum number of samples in the node.

2. The method for penalty prediction and disposal decision of illegal fishing events according to claim 1, the to-be-decided sentence vector is:

$$\text{sen\_vec} = \frac{\sum_i^m vec_i * \lambda_{norm_i}}{m}$$

$$\mu_{norm} = \frac{\mu}{\sqrt{\sum_{i=1}^{m}(TF - IDF_i^2)}}$$

$$\mu_{norm} = (\lambda_{norm_1}, \lambda_{norm_2}, \ldots, \lambda_{norm_m})$$

$$\mu = (TF - IDF_1, TF - IDF_2, \ldots, TF - IDF_m)$$

$$TF - IDF_i = tf_i * idf_i$$

$$tf_i = N(i \mid D)$$

$$idf_i = \log\left(\frac{n+1}{N(D \mid i) + 1}\right) + 1$$

wherein, sen_vec is the to-be-decided sentence vector; $vec_i$ is the case word vector of the i-th case word; $\lambda_{norm_i}$ is the normalized TF-IDF weight value of the i-th case word; μ is the TF-IDF weight value vector for all case words; $\mu_{norm}$ is the normalized TF-IDF weight value vector for all case words; m is the number of all case words in the to-be-decided fishing event; $TF\text{-}IDF_i$ is the original TF-IDF weight value for the i-th case word; n is the number of the historical illegal fishing cases; $tf_i$ is the word frequency of case word i; $idf_i$ is the inverse word frequency of case word i; N(i|D) is the number of times the i-th case word appears in illegal fishing case D; N(D|i) is the number of illegal fishing cases containing the case word i.

3. The method for penalty prediction and disposal decision of illegal fishing events according to claim 1, before preprocessing the to-be-decided fishing event and the plurality of historical illegal fishing cases respectively based on the shore-based server, the method further comprising:

based on the shore-based server, determining missing cases with data deficiencies among the plurality of historical illegal fishing cases, and removing the missing cases.

4. The method for penalty prediction and disposal decision of illegal fishing events according to claim 1, the cosine similarity model is:

$$\text{similarity} = \frac{\text{sen\_vec}_A \cdot \text{sen\_vec}_B}{\|\text{sen\_vec}_A\| \times \|\text{sen\_vec}_B\|}$$

where, $\text{sen\_vec}_A$ is the sentence vector of fishing case A; $\text{sen\_vec}_B$ is the sentence vector of fishing case B; $\| \|$ is the symbol for modulo operation.

5. The method for penalty prediction and disposal decision of illegal fishing events according to claim 1, after obtaining the penalty amount prediction model, the method further comprising:

determining a test subset from the illegal fishing case dataset;

inputting the test subset into the penalty amount prediction model to obtain a penalty amount prediction set corresponding to the test subset;

based on the penalty amount prediction set and the true penalty amount values in the test subset, determining whether the penalty amount prediction model meets requirements.

6. An apparatus for penalty prediction and disposal decision of illegal fishing events, applied to a system composed of a shipborne terminal, a shipborne controller, and a shore-based server, the apparatus comprising:

an illegal fishing case acquisition unit, configured to acquire a to-be-decided fishing event based on the shipborne terminal and obtain an illegal fishing case dataset stored in the shore-based server, where the illegal fishing case dataset includes a plurality of historical illegal fishing cases;

a sentence vector determination unit, configured to preprocess the to-be-decided fishing event and the plurality of historical illegal fishing cases respectively based on the shore-based server, correspondingly obtaining a to-be-decided sentence vector and a plurality of historical sentence vectors;

a fishing case determination unit, configured to determine a plurality of similarity values between the to-be-decided sentence vector and the plurality of historical sentence vectors based on a cosine similarity model built into the shore-based server, and based on the plurality of similarity values, determine a target illegal fishing case corresponding to the to-be-decided fishing event from the plurality of historical illegal fishing cases;

a penalty amount prediction unit, configured to control the shore-based server to train a penalty amount prediction model based on the illegal fishing case dataset, and input the to-be-decided fishing event into the penalty amount prediction model to obtain a predicted penalty amount for the to-be-decided fishing event;

the shore-based server is configured to generate a first control instruction when the case similarity and the predicted penalty amount fall within a first grading threshold, generate a second control instruction when the case similarity and the predicted penalty amount fall within a second grading threshold, and generate a third control instruction when the case similarity and the predicted penalty amount fall within a third grading threshold;

the shipborne controller receives the first control instruction, the second control instruction, and the third control instruction, responds to the first control instruction by controlling a shipborne alarm system to issue a voice reminder, responds to the second control instruction by cutting off shipborne instrument equipment except those related to navigation and positioning, and responds to the third control instruction by cutting off shipborne instrument equipment except those related to navigation and positioning, and through law enforcement agencies, dispatching law enforcement vessels to forcibly interrupt the fishing activity;

wherein the data type of the to-be-decided fishing event is text data; then preprocessing the to-be-decided fishing event to obtain the to-be-decided sentence vector comprises:

performing word segmentation processing on the to-be-decided fishing event based on a Jieba word segmentation tool built into the shore-based server, to obtain a plurality of case words;

processing the plurality of case words based on a vectorization model built into the shore-based server, to obtain a plurality of case word vectors;

determining a plurality of word weights for the plurality of case words based on the shore-based server, and determining the to-be-decided sentence vector for the to-be-decided fishing event based on the plurality of word weights and the plurality of case word vectors;

wherein the shore-based server trains a penalty amount prediction model based on the illegal fishing case dataset, comprises:

determining a training subset from the illegal fishing case dataset; the training subset includes a plurality of historical illegal fishing cases;

determining feature attributes for each historical illegal fishing cases based on a preset extraction rule;

encoding all branch results of the feature attributes to obtain label encoding;

training to obtain a to-be-pruned penalty amount prediction model based on the label encoding, a splitting index, and a stopping tree index;

determining a validation subset from the illegal fishing case dataset, and determining a plurality of subtrees of the to-be-pruned penalty amount prediction model;

calculating a pruning evaluation value for each subtree on the validation subset, then determining an evaluation standard value using cross-validation, subsequently checking each subtree one by one, and pruning the subtree if the pruning evaluation value of the entire tree after pruning this subtree is not higher than the pruning evaluation value of the entire tree before pruning; repeating this process until stable, to obtain the penalty amount prediction model;

wherein the to-be-pruned penalty amount prediction model includes a plurality of split points, and the plurality of historical illegal fishing cases are divided into a first subset and a second subset after passing through a split point, then the splitting index is:

$$\sigma_n^2 = n_1 \times \sigma_1^2 + n_2 \times \sigma_2^2$$
$$\sigma_1^2 = \sum (y_i - c_1)^2$$
$$\sigma_2^2 = \sum (y_j - c_2)^2$$

where, $$\sigma_n^2$$

is the weighted squared error of the splitting point; $n_1$ is the number of cases in the first subset;

$$\sigma_1^2$$

is the squared error of the first subset; $n_2$ is the number of cases in the second subset;

$$\sigma_2^2$$

is the squared error of the second subset; $y_i$ is the output value of the i-th historical illegal fishing case in the first subset; $y_j$ is the output value of the j-th historical illegal fishing case in the second subset; $c_1$ is mean output of all historical illegal fishing cases in the first subset; $c_2$ is the mean output of all historical illegal fishing cases in the second subset;

the pruning evaluation index is:

$$C_\alpha(T) = C(T) + \alpha|T|$$
$$C(T) = \frac{1}{N}\sum_{a=1}^{N}(y_a - \hat{y}_a)^2$$

where, $C_\alpha(T)$ is the pruning evaluation value of the T-th subtree; C(T) is the mean square error obtained by running the validation subset in the T-th subtree; N is the number of samples in the T-th subtree; $y_\alpha$ is the true value of the $\alpha$-th sample; $\hat{y}_\alpha$ is the predicted value of the $\alpha$-th sample; |T| is the number of leaf nodes in the sub number; $\alpha$ is a complexity parameter used to balance the model's fitting ability and complexity;

wherein the stopping tree indicator is the minimum number of samples in the node.

* * * * *